United States Patent
Guerreri et al.

(10) Patent No.: US 9,392,243 B2
(45) Date of Patent: *Jul. 12, 2016

(54) IMAGING DATA CORRECTION SYSTEM AND METHOD

(71) Applicant: Electronic Warfare Associates, Inc., Herndon, VA (US)

(72) Inventors: Carl N. Guerreri, Manassas, VA (US); Lester Anderson Foster, III, Frederick, MD (US)

(73) Assignee: ELECTRONIC WARFARE ASSOCIATES, INC., Herndon, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/801,711

(22) Filed: Jul. 16, 2015

(65) Prior Publication Data

US 2015/0324986 A1 Nov. 12, 2015

Related U.S. Application Data

(63) Continuation of application No. 14/558,416, filed on Dec. 2, 2014, now Pat. No. 9,118,881, which is a continuation of application No. 13/887,407, filed on May 6, 2013, now Pat. No. 8,928,758.

(60) Provisional application No. 61/661,161, filed on Jun. 18, 2012, provisional application No. 61/679,090, filed on Aug. 30, 2012.

(51) Int. Cl.
*H04N 9/73* (2006.01)
*H04N 9/04* (2006.01)
(Continued)

(52) U.S. Cl.
CPC ............... *H04N 9/735* (2013.01); *G06T 5/006* (2013.01); *G06T 7/0018* (2013.01); *H04N 9/04* (2013.01); *H04N 17/002* (2013.01); *G06T 2207/10004* (2013.01); *G06T 2207/10048* (2013.01)

(58) Field of Classification Search
CPC ....... H04N 9/04; H04N 9/735; H04N 17/002; G06T 5/006; G06T 7/0018; G06T 2207/10048
See application file for complete search history.

(56) References Cited

U.S. PATENT DOCUMENTS 4,343,021 A * 8/1982 Frame ................. H04N 5/2176 348/247
5,020,116 A * 5/1991 Macaulay ................. H01J 9/44 348/177

(Continued)

FOREIGN PATENT DOCUMENTS

JP 2002/0296709 10/2002

OTHER PUBLICATIONS

Galilea et al., "Calibration of a High-Accuracy 3-D Measurement Sensor Based on Laser Beam and CMOS Camera." IEEE Transactions on Instrumentation and Measurement, 2009, pp. 3341-3346.

(Continued)

*Primary Examiner* — Brian Yenke
(74) *Attorney, Agent, or Firm* — DLA Piper LLP US

(57) ABSTRACT

Methods and systems for use in calibrating imaging data, are provided that include using a calibration array to generate a test pattern. The calibration array can emit a test pattern having geometric, temporal, and electromagnetic characteristics. The collected data can be compared with the geometric, temporal and electromagnetic characteristics to determine an error factor that can then be used in analyzing the collected data.

32 Claims, 4 Drawing Sheets

(51) Int. Cl.
*G06T 7/00* (2006.01)
*G06T 5/00* (2006.01)
*H04N 17/00* (2006.01)

(56) References Cited

U.S. PATENT DOCUMENTS

| | | | | |
|---|---|---|---|---|
| 5,563,420 | A * | 10/1996 | Sullivan | G01J 3/10 250/493.1 |
| 5,572,444 | A * | 11/1996 | Lentz | H04N 17/02 348/181 |
| 5,650,844 | A * | 7/1997 | Aoki | H04N 17/04 348/180 |
| 5,734,158 | A * | 3/1998 | Nagashima | G02F 1/1309 250/225 |
| 6,072,603 | A * | 6/2000 | Parks | H04N 5/3653 348/E5.081 |
| 6,509,956 | B2 * | 1/2003 | Kobayashi | G03F 7/706 355/53 |
| 6,542,185 | B1 * | 4/2003 | Bogardus | H04N 9/735 348/188 |
| 7,200,497 | B2 * | 4/2007 | Wang | H04M 1/24 248/187.1 |
| 7,515,094 | B2 * | 4/2009 | Keller, III | F41H 3/00 342/13 |
| 7,539,563 | B2 * | 5/2009 | Yang | G05D 1/0246 180/167 |
| 7,932,917 | B2 * | 4/2011 | Han | G09G 3/006 324/760.01 |
| 8,189,957 | B2 * | 5/2012 | Tan | G03B 21/00 348/51 |
| 8,300,103 | B2 * | 10/2012 | He | G03B 43/00 348/180 |
| 8,629,909 | B2 * | 1/2014 | Askey | G01M 11/0264 348/175 |
| 2003/0007077 | A1 * | 1/2003 | Maggi | H04N 17/002 348/223.1 |
| 2005/0243286 | A1 * | 11/2005 | Kobayashi | H04N 5/74 353/69 |
| 2006/0138488 | A1 * | 6/2006 | Kim | H01L 27/14603 257/292 |
| 2010/0112469 | A1 * | 5/2010 | Miyaharu | G03B 27/54 430/30 |
| 2010/0125356 | A1 * | 5/2010 | Shkolnik | B29C 67/0088 700/98 |
| 2013/0002443 | A1 * | 1/2013 | Breed | G01J 5/0846 340/686.1 |
| 2013/0088589 | A1 * | 4/2013 | Negoro | G01J 1/04 348/135 |
| 2014/0098336 | A1 * | 4/2014 | Mo | G02F 1/133788 349/192 |

OTHER PUBLICATIONS

Woodward Woodward et al., "Hyperspectral Imager Characterization and Calibration." IEEE International Geoscience and Remote Sensing Symposium, 2009, pp. 77-80.
U.S. Appl. No. 13/887,407.
U.S. Appl. No. 14/558,416.

* cited by examiner

IMAGING DATA CORRECTION SYSTEM AND METHOD

CROSS-REFERENCE TO RELATED APPLICATIONS

This application is a Continuation Application based on U.S. patent application Ser. No. 14/558,416, filed Dec. 2, 2014, which issued as U.S. Pat. No. 9,118,811 on Aug. 25, 2015. U.S. Pat. No. 9,118,881 is based on and derives the benefit of the filing date of U.S. patent application Ser. No. 13/887,407, filed May 6, 2013, which issued as U.S. Pat. No. 8,928,758 on Jan. 6, 2015. U.S. Pat. No. 8,928,758 is based on and derives the benefit of the filing date of U.S. Provisional Patent Applications No. 61/661,161, filed Jun. 18, 2012 and No. 61/679,090, filed Aug. 3, 2012. The entire content of all of these applications are herein incorporated by reference in their entireties.

FIELD OF THE INVENTION

The present technology relates to systems and methods for correcting imaging data collected by imaging sensors, and in particular to methods and calibration systems that use calibration arrays that emit a test pattern.

DESCRIPTION OF RELATED ART

A variety of test patterns are known for use in calibrating standard optical sensors. For example, physical or digital cards having a known pattern, whether of black, white, patterns of black and white, or patterns of color, have all been used as a basis for adjusting chroma and tint with respect to cameras and visual broadcast receivers. Most modern test patterns for optical sensors include a known set of color bars that produce a characteristic pattern of "dot landings" on a vectorscope, so that precise adjustments to equipment can be made.

Normally, a test pattern is used to calibrate equipment before the equipment is used for its intended purpose. In such instances, the equipment is set up, the sensor is aimed at the test pattern having known characteristics, and an operator adjusts the equipment settings so that the data output by the sensor accurately describes the known characteristics of the test pattern. For example, in television programming, a test pattern can be used in a studio, or in the on-location environment of an intended broadcast, just prior to conducting the broadcast, in order to calibrate the cameras by adjusting their output adjust the image quality of the cameras, which can be affected by environmental conditions such as the lighting conditions. In another example, monitoring equipment that is going to be used to monitor remote locations, such as equipment used on an airplane or a satellite, is normally calibrated using test patterns in lab or local field conditions to adjust the equipment settings and output before the equipment is used.

SUMMARY OF THE INVENTION

Calibration methods and systems of the present technology include a calibration array that can be controlled to generate a test pattern having geometric, temporal and electromagnetic characteristics.

In one aspect, a method of correcting imaging data received from a sensor is provided. The method can include placing a calibration system into an environment comparable to an environment from which imaging data is to be collected by a sensor during a data collection time period. The calibration system can be configured to emit a test pattern having geometric, temporal, and electromagnetic characteristics, the calibration system having at least one emission point, each emission point including at least one emission source that emits in a region of the electromagnetic spectrum. The calibration system can then emit the test pattern having the geometric, temporal, and electromagnetic characteristics with the calibration array during the data collection time period. The imaging data can be collected from the calibration system with a sensor during the data collection time period. The method can further include comparing the imaging data collected from the calibration system by the sensor to the geometric, temporal, and electromagnetic characteristics of the test pattern to determine an imaging error factor based on differences between the hyperspectral imaging data collected from the calibration system by the sensor and the geometric, temporal, and electromagnetic characteristics of the test pattern, and correcting the imaging data by the error factor.

In another aspect, a calibration system is provided that can be placed into an environment comparable to an environment from which imaging data is to be collected by a sensor and used for correcting imaging data received from the sensor. The calibration system can include a calibration array, a control unit operatively connected to the calibration array, and a transmitter operatively connected to the control unit. The calibration array can emit a test pattern having geometric, temporal, and electromagnetic characteristics. The calibration array can include a plurality of emission points, each emission point including at least one emission source that emits in a region of the electromagnetic spectrum. The control unit can provide test pattern commands to the calibration array in order to cause the calibration array to emit the test pattern. The transmitter can transmit data from the calibration system to a remote location.

BRIEF DESCRIPTION OF THE DRAWINGS

Specific examples have been chosen for purposes of illustration and description, and are shown in the accompanying drawings, forming a part of the specification.

DETAILED DESCRIPTION

Figure 1:
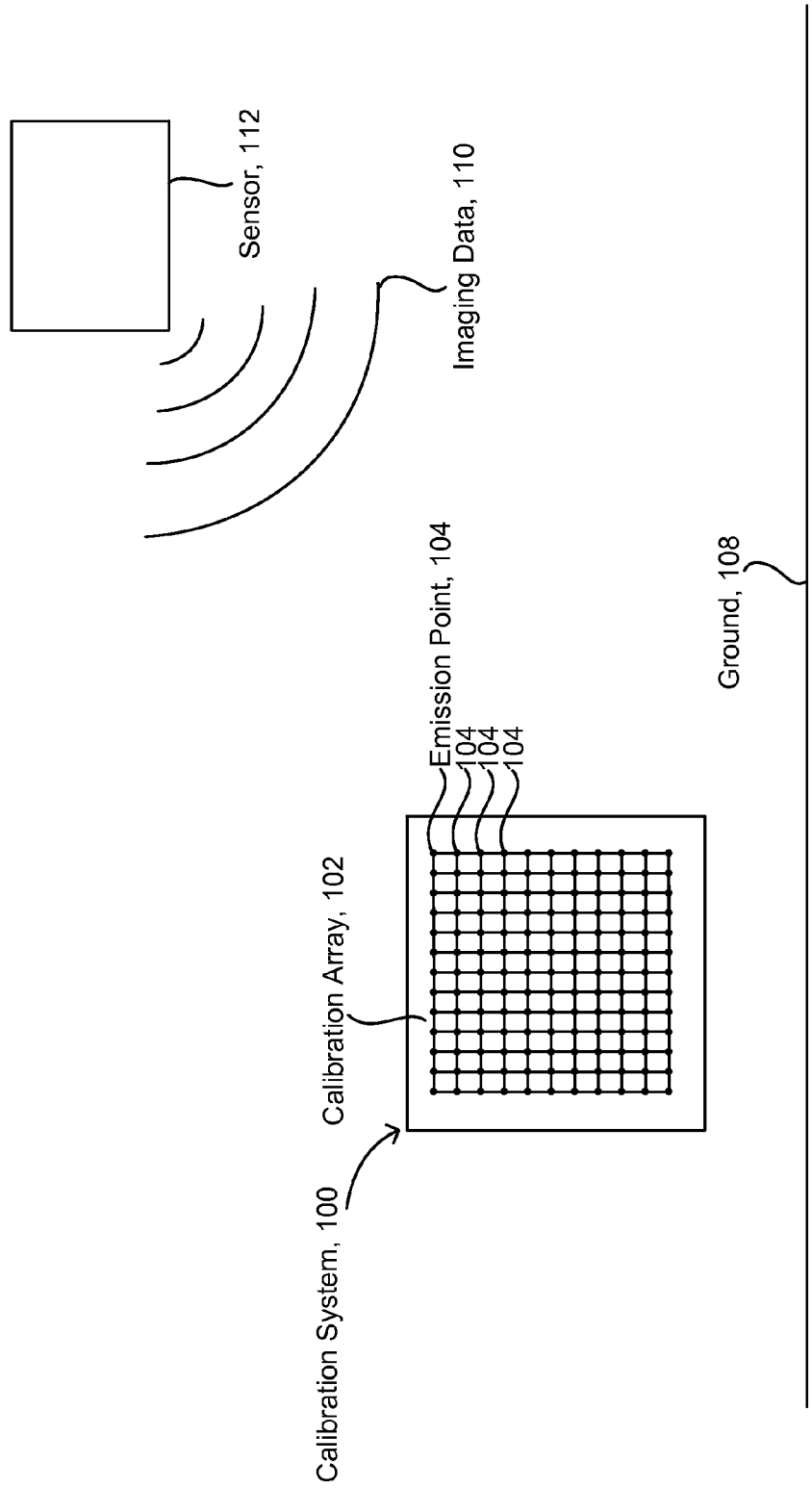
FIG. 1 illustrates one example of a trans-spectral sensor collecting imaging data from an environment into which a calibration system of the present technology has been placed.

Imaging sensors can be used to collect imaging data and create images of a monitored environment. A monitored environment can be any environment monitored by an imaging sensor, and, depending upon the application, can include any physical location or geographic area. In some non-limiting examples, imaging sensors can be carried by an aircraft or satellite. However, environmental conditions and atmospheric variables, such as temperature, airborne dust, water vapor, ozone, and atmospheric attenuation, can distort imaging data collected by an imaging sensor, so that even if the imaging sensor is properly calibrated the output of the sensor will not provide an accurate image based on the collected imaging data.

Methods and systems of the present technology can be used for correcting imaging data received from a sensor to compensate for such environmental effects by using test patterns having geometric, temporal, and electromagnetic characteristics.

One type of imaging sensor that can be used with the methods and systems of the present technology is a trans-spectral imaging sensor. Trans-spectral imaging sensors can be used to create images of a monitored environment utilizing light from a plurality of regions of the electromagnetic spectrum, ranging from ultraviolet (UV) to far infrared, including for example visible light, near infrared (NIR), short wave infrared (SWIR), medium wave infrared (MIR), and long wave infrared (LWIR). In particular, as used herein, the term trans-spectral refers to the use of light from at least two regions of the electromagnetic spectrum. Trans-spectral imaging sensors collect trans-spectral imaging data to form images of a monitored environment.

In some examples, such as applications that use trans-spectral imaging sensors, the test patterns can be trans-spectral test patterns. As used herein, the term trans-spectral test pattern refers to a test pattern that includes emissions in two or more regions of the electromagnetic spectrum. For example, a trans-spectral test pattern can include a first emission in a region of the electromagnetic spectrum selected from the group consisting of ultraviolet (UV), visible light, near infrared (NIR)(wavelength of 0.75 μm to 1.4 μm), short wave infrared (SWIR)(wavelength of 1.4 μm to 3 μm), medium wave infrared (MIR)(wavelength of 3 μm to 8 μm), long wave infrared (LWIR) (wavelength of 8 μm to 15 μm), and far infrared (FIR)(wavelength above 15 μm). A trans-spectral test pattern can also include a second emission in a region of the electromagnetic spectrum selected from the same group, but that is different from the region of the electromagnetic spectrum of the first emission.

With reference to FIGS. 1 to 4, one example of a method of the present technology can include providing a calibration system 100 comprising a calibration array 102 configured to emit a trans-spectral test pattern having geometric, temporal, and electromagnetic characteristics. The calibration array 102 can have a plurality of emission points 104, each emission point 104 including at least one emission source 106 that emits in a region of the electromagnetic spectrum. The method can also include placing the calibration system 100 into an environment similar to or the same as an environment from which imaging data is to be collected, such as deploying the calibration system 100 on the ground 108, from which trans-spectral imaging data 110 is to be collected by a trans-spectral sensor 112 during a data collection time period. It should be noted that the environment into which the calibration system 100 is placed can be any desired environment, such as a field, forest, desert, city, industrial area, rooftop, or any other environment in which the trans-spectral test pattern can be viewed by a trans-spectral sensor. Additionally, the calibration system 100 can be placed overtly or covertly. The calibration array can be placed on or adjacent to the object to be imaged. Alternatively, the calibration array can be placed a distance, which can range from inches, to feet, to kilometers, to miles, depending upon the application, from the object to be imaged as long as the environment from which imaging data is to be collected is comparable to the environment in which the calibration array is positioned. The environment from which imagining data is to be collected is comparable to the environment in which the calibration array is positioned when the output of the sensor, when the sensor is trained on the object or area to be imaged, and the output of the sensor, when the sensor is trained on the calibration array, is affected by the atmosphere in substantially the same way.

Further, the data collection time period can have a duration and a frequency. The duration of the data collection time period can be any desired duration, ranging from a fraction of a second up to a number of years, including seconds, minutes, days, weeks, or months. The frequency of the data collection time period can be a single instance, or can be periodic. Thus, in some examples, the data collection time period could be a single instance in which trans-spectral imaging data is collected for a fraction of a second, or a continuous period in which trans-spectral imaging data is collected for a plurality of minutes or hours, or even a periodic occurrence in which trans-spectral imaging data is collected for a plurality of seconds or minutes each day.

Once the calibration system 100 is placed, the calibration array 102 can emit the trans-spectral test pattern at some point during the data collection time period, and the trans-spectral sensor 112 can collect trans-spectral imaging data. The trans-spectral sensor can have a field of view from which it collects the trans-spectral imaging data 110. The field of view can cover an area of the environment in which the calibration system 100 has been placed. The area covered by the field of view can include at least the area occupied by the calibration system 100, and can include additional area around the calibration system 100. The additional area can span any distance, such as inches, feet, kilometers, or miles.

The trans-spectral test pattern emitted by the calibration array 102 can have geometric, temporal, and electromagnetic characteristics. For example, referring to FIG. 2, the calibration system 100 can include the calibration array 102. The calibration array 102 can include the plurality of emission points 104 and a non-emitting surface 114. A calibration array 102 can have any suitable shape, and can be 1-dimensional, 2-dimensional or 3-dimensional. The non-emitting surface 114 can be non-reflective, such as being black. In some examples, the non-emitting surface 114 can be made from a non-reflective material, or can be surface treated to be non-reflective, such as being coated or covered. In at least one example, the calibration array 102 can also include a panel 144 of known trans-spectral reflectance. For example, a white panel 144 having maximum reflectance across all spectral wavelengths can be used to establish optimal contrast, since the imaging data collected by an imaging sensor 112 can include both the black of a non-reflective non-emitting surface and the maximum reflectance of all spectral wavelengths of the white panel 144. A trans-spectral reflective panel 144 with a gradient of reflectivity can be used to assess sensor dynamic range performance across the spectral wavelengths. Each emission point 104 can be located at a known location on the non-emitting surface 114. In the example illustrated in FIG. 2, the emission points 104 are arranged on an X-Y coordinate system, with each emission point 104 having a known x-coordinate and a known y-coordinate.

Figure 2:
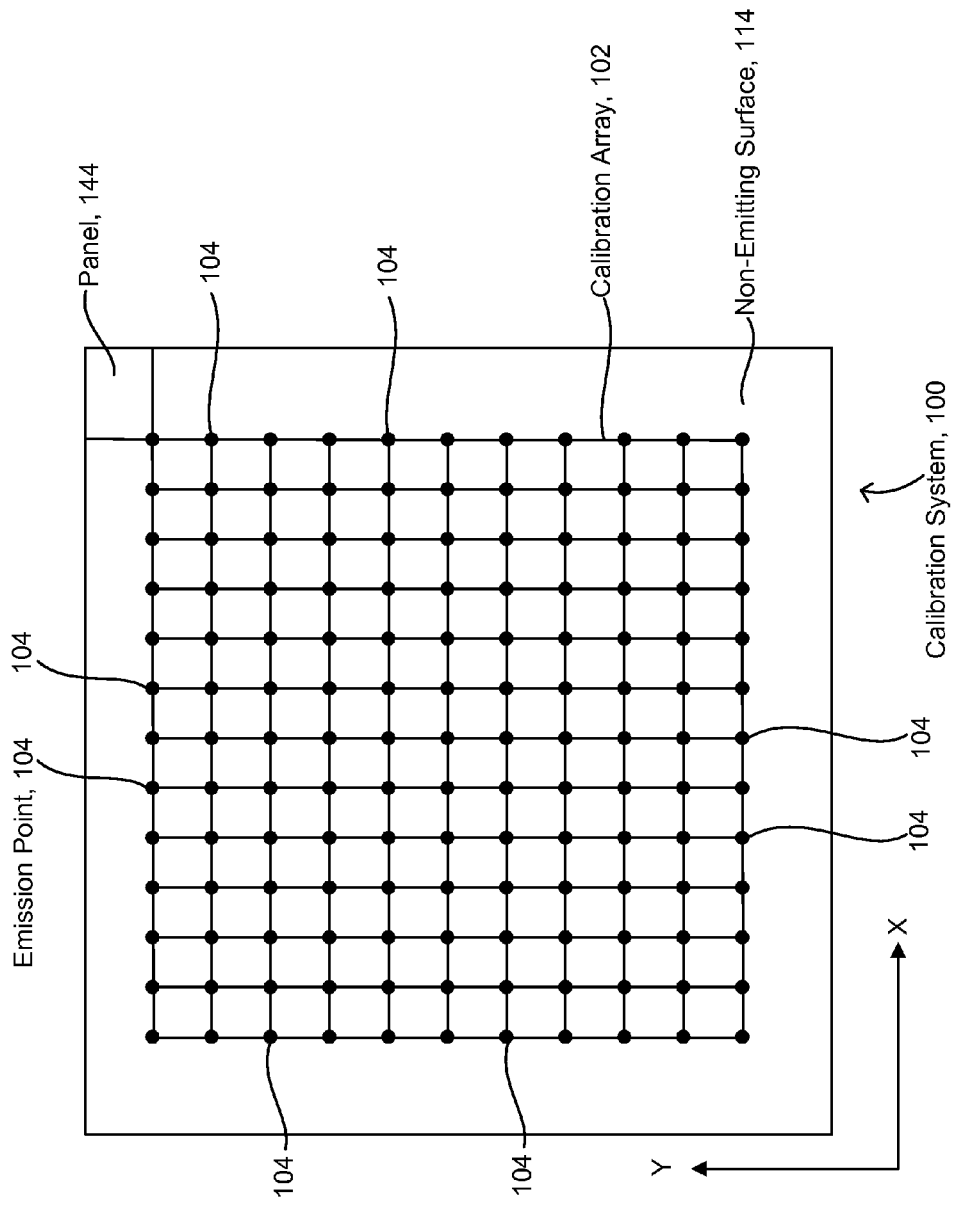
FIG. 2 illustrates one example of a calibration array that can be used in a calibration system of FIG. 1.
Figure 3:
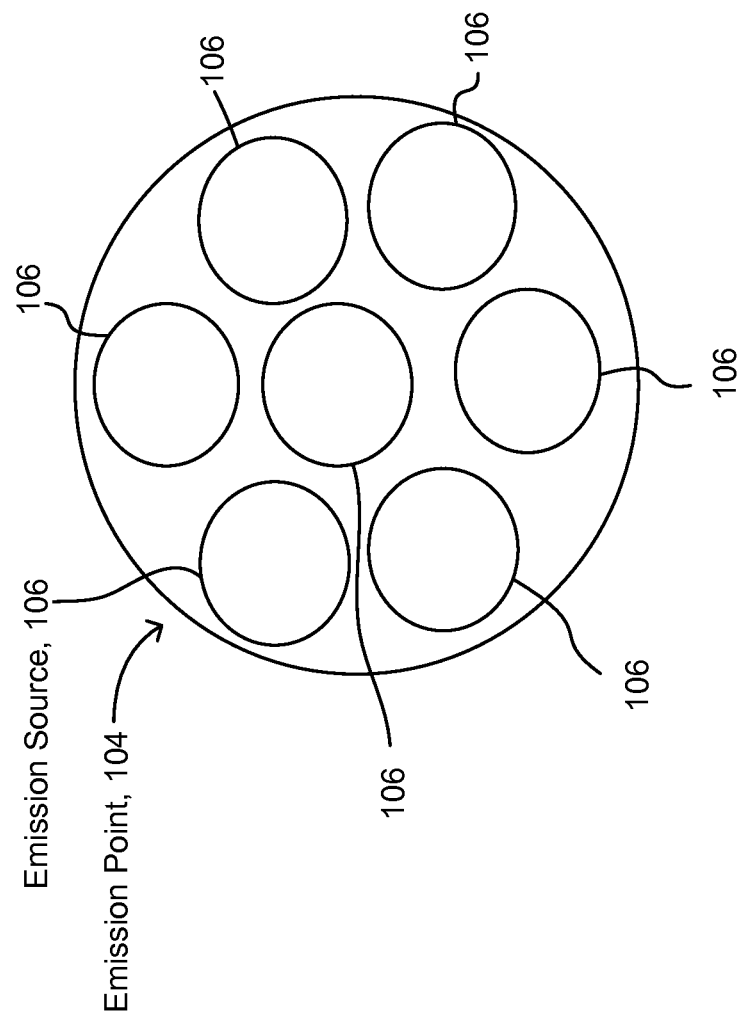
FIG. 3 illustrates one example of an emission point on a calibration array of FIG. 2.

Referring to FIGS. 2 and 3, each emission point 104 can include at least one emission source 106 that emits in a region of the electromagnetic spectrum. As shown in FIG. 3, each emission point 104 can include a plurality of emission sources 106. In such an example, each emission source 106 can emit with a different electromagnetic signature. In at least one example, each emission source 106 can be activated or deactivated independently of the other emission sources 106. Examples of emissions sources that can be used in the present technology include, but are not limited to incandescent lamps, light emitting diodes (LEDs), laser diodes, fiber optics or calibrated blackbody sources.

The trans-spectral test pattern can be generated by activating at least a first emission source 106 at a first emission point 104 and a second emission source 106 at the first or any other emission point 104, where the first emission source 106 emits with a first electromagnetic signature and the second emission source 106 emits with a second electromagnetic signature that is different from the first signature. At least one emission source 106 at any plurality of emission points 104 can be activated to form a trans-spectral test pattern.

Additionally, the trans-spectral test pattern can be varied by altering or varying the number of emission sources 106 or emission points 104 that are activated at or during any given data collection time. Trans-spectral test patterns can be varied with respect to several factors, including geometric configuration, time, emission wavelength, and intensity. A trans-spectral test pattern can be arranged to provide a pattern having areas with and without light sources. Some trans-spectral test patterns can be designed for narrow bands of operation, and can utilize emission sources with output that is limited to a desired narrow band of the spectrum. Alternatively, trans-spectral test patterns can include a wide spectrum of emissions within the electromagnetic spectrum.

The electromagnetic characteristics of the trans-spectral test pattern can include the regions of the electromagnetic spectrum in which each activated emission source 106 emits, including the particular frequency or range of frequencies at which each activated emission source 106 emits.

The geometric characteristics of the trans-spectral test pattern can include the location of each emission point 104 at which an emission source 106 is activated to generate the trans-spectral test pattern. The geometric characteristics of the trans-spectral test pattern can also include a shape that is formed by the activated emission sources 106 at the emission points 104 included in the trans-spectral test pattern. The shape can be any regular or irregular shape, including but not limited to a line, a square, a rectangle, a circle, an oval, or a grid.

The temporal characteristics of the trans-spectral test pattern can include the clock time at which the test pattern is emitted, the duration of time during which the test pattern is emitted, and any timing of variations in the test pattern emissions. For example, the system could emit a trans-spectral test pattern that includes an emission from a first emission source in a first region of the electromagnetic spectrum at a first time, and an emission from a second emission source in a second region of the electromagnetic spectrum at a second time.

Figure 4:
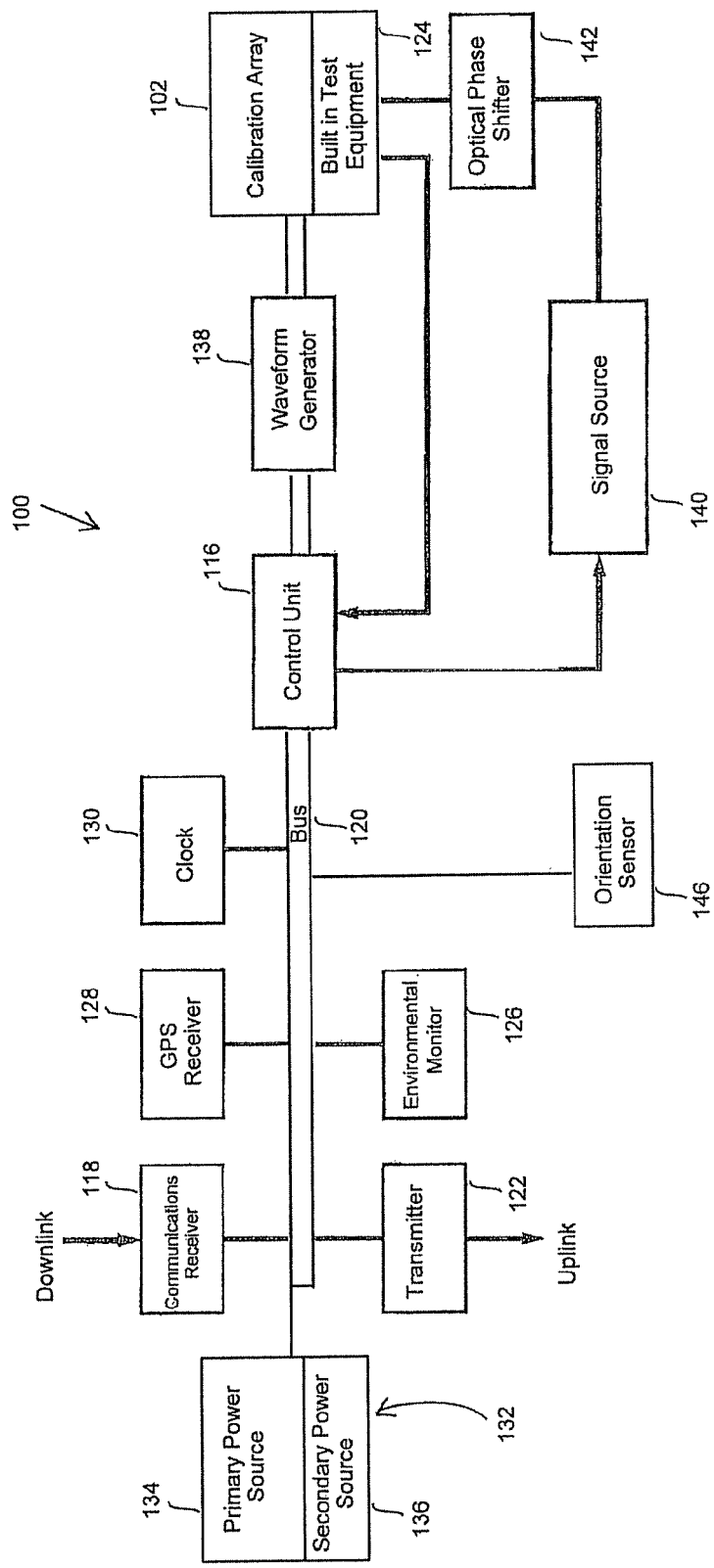
FIG. 4 illustrates one example of a calibration system of FIG. 1.

Referring to FIG. 4, the calibration system 100 can include a control unit 116 operatively connected to the calibration array 102. The control unit 116 can be configured to receive, store, transmit, and execute commands, such as test pattern commands, which can include the geometric, temporal, and electromagnetic characteristics of the trans-spectral test pattern to be generated by the calibration array 102. The control unit 116 can also be configured to receive, store, and transmit data collected from other components of the calibration system 100. Control unit 116 can, for example, include a processor, a Field Programmable Gate Array (FPGA) or any other digital or analog circuitry.

The control unit 116 can transmit test pattern commands from the control unit to the calibration array in order to cause the calibration array to emit the trans-spectral test pattern. In one such an example, the control unit 116 can be pre-programmed prior to being placed in the environment from which trans-spectral imaging data is to be collected to cause the calibration array to generate a certain trans-spectral test pattern at a certain data collection time. In another example, the calibration system 100 can include a communications receiver 118 operatively connected to the control unit 116 that receives test pattern commands from a remote location and provides the test pattern commands to the control unit 116. Alternatively, control unit 116 can be pre-programmed to actuate calibration array 102 at and for specific times (e.g., when a satellite passes over).

Referring back to FIG. 1, the trans-spectral imaging data 110 collected by the trans-spectral sensor 112 can be compared to the geometric, temporal and electromagnetic characteristics of the trans-spectral test pattern to determine an imaging error factor based on differences between the trans-spectral imaging data 110 collected by the trans-spectral sensor 112 and the geometric, temporal, and electromagnetic characteristics of the trans-spectral test pattern. The imaging error factor may be based on intensity variations, frequency shift, etc. The trans-spectral imaging data 110 collected by the trans-spectral sensor 112 can then be corrected based on the error factor. In this manner, distortions of the trans-spectral imaging data caused by environmental effects, such as weather conditions, lighting conditions, and atmospheric attenuation, among other things, can be determined and accounted for when analyzing the collected trans-spectral imaging data.

The error factor is based upon the illumination of the focal plane array of sensor 112 by emission sources 106 based upon relative location and orientation of the calibration array 102 to the sensor 112, and the field of view of each of the individual pixels of sensor 112. Under ideal atmospheric conditions, an estimate of the power of each emission source 106 can be determined for each focal plane array pixel of sensor 112. Then actual measurements are collected from the sensor 112 when the array 102 is emitting and in the sensor field of view. The difference between the ideal image and the actual image of the array 102 provides a correction or error factor to compensate for non-ideal atmospheric propagation. Since the emission sources 106 can be modulated for operation individually and in groups across the spectrum, it is possible that the error factors may correct for limited cross-pixel image blur from atmospheric turbulence or density variations and minor imager optics lens aberrations.

The imaging data 110 collected by the sensor 112 can then be analyzed based on the error factor. In this manner, the effect of distortions of imaging data, which can be caused by weather conditions, lighting conditions, and atmospheric attenuation, among other things, can be determined and accounted for when analyzing the collected hyperspectral imaging data. The error factor determined from the pixels of the sensor 102 focal plane in which array 102 is imaged can now be used to compensate image data across the entire focal plane array and collected images in the comparable environment of the array 102. The error factor data is added logarithmically to each pixel for each band of electromagnetic spectrum in which the sensor 102 operates.

As illustrated in FIG. 4, the calibration system can have several components, and each component can be operatively connected to the control unit 116, or to another component, in any suitable manner, such as by bus 120. The bus 120 can include any number of transmission lines operatively connected to any one or more of the components of the calibration system 100.

In the illustrated example, the calibration system 100 can include communication system such as a transmitter 122 operatively connected to the control unit 116 that transmits data from the calibration system to a remote location. Alternatively, the communication system may include a memory device or may be hard-wired. As used herein, a remote location should be understood to mean any location that is not internal to the calibration system 100, but is instead outside of and separate from the calibration system 100. A remote location can be located at any distance from the calibration system 100, and can be within or outside of the environment from which imaging data is to be collected. In this manner, potentially data can be provided from the calibration system 100 to users operating the imaging sensor and analyzing the imaging data received from the imaging sensor.

Another component that the calibration system 100 can include is built in test equipment 124, which can be operatively connected to the control unit 116. The built in test equipment 124 can collect test pattern data while the calibration array is emitting the trans-spectral test pattern. The test pattern data collected by the built in test equipment 124 can include the state of each emission point 104, or of each emission source 106, of the calibration array 102. The state of an emission point 104 can include information regarding whether any emission source 106 was activated, as well as the electromagnetic characteristics of any activated emission source 106, the time at which any emission source 106 was activated, and/or the duration for which any emission source 106 was activated. The test pattern data can also include the geometric characteristics of the test pattern actually generated by the calibration array 102. The test pattern data collected by the built in test equipment 124 can be transmitted to the remote location by the transmitter 122. The test pattern data collected by the built in test equipment 124 can be compared to the geometric, temporal, and electromagnetic characteristics of the test pattern to determine a test pattern error factor based on any differences between the test pattern data and the geometric characteristics and electromagnetic characteristics of the test pattern, and the imaging error factor can be adjusted based on the test pattern error factor. Alternatively, the built in test equipment output can become the calibration array emission data set used to project the calibration array emissions into the image sensor focal plane array pixels.

A calibration system 100 can also include an environmental monitor 126, which can be operatively connected to the control unit 116. The environmental monitor 126 can collect environmental data regarding the environment in which the calibration system is placed. Such environmental data can include, for example, temperature, wind velocity, precipitation, and/or barometric pressure. The environmental monitor 126 can also collect environmental data regarding the internal or surface environment of the calibration array. For example, when the trans-spectral test pattern includes LWIR emissions, it may be desirable to collect environmental data regarding the surface temperature of the calibration array 102 and the temperature of the emission source 106 emitting the LWIR signal. Environmental data collected by the environmental monitor 126 can be included in the data transmitted to the remote location by the transmitter 122.

A calibration system 100 can also include a GPS receiver 128, which can be operatively connected to the control unit 116. The GPS receiver 128 can receive global positioning signals and generate positioning data, including for example the longitude and latitude at which the calibration system 100 is placed, which can be included in the data transmitted to the remote location by the transmitter 122.

Alternatively or in addition to the GPS receiver 128, a calibration system 100 can include a clock 130, which can be operatively connected to the control unit 116. The clock 130 can provide time data, which can be included in the data transmitted to the remote location by the transmitter 122. Time data can include, for example, the time at which the calibration system 100 was placed, times at which the calibration system 100 generates a trans-spectral test pattern, and/or the duration for which the calibration system 100 generates a trans-spectral test pattern. The clock 130 can also be employed to control the actuation of calibration array 102.

The calibration system 100 can also include a power source 132, which can be used to power the components of the calibration system 100. The power source 132 can include a primary power source 134 and a secondary power source 136. The primary power source can include at least one rechargeable battery. The secondary power source can include a power generator that generates power from an environmental stimulus, such as a solar panel that generates power from sunlight, or a windmill that generates power from the wind. Alternatively, the secondary power source can generate electricity from any other energy source. Power generated by the secondary power source can be used to recharge the primary power source, or to provide power directly to the components of the calibration system 100.

The calibration system 100 can also include an orientation sensor 146, which can be operatively connected to the control unit 116. The orientation sensor 146 can measure and collect orientation data regarding the orientation of the calibration system 100, including directional orientation, which can be measured in three dimensional orientation terms such as yaw, pitch, and roll.

Referring to FIGS. 3 and 4, when the emissions sources 106 of the present technology include incandescent lamps, light emitting diodes (LEDs), laser diodes, or the like, a waveform generator 138 can be included in the calibration system 100. The control unit 116 can transmit test pattern commands to the waveform generator to cause the calibration array to generate the trans-spectral test pattern.

When the emissions sources 106 of the present technology include fiber optics, a plurality of fiber optics can be provided, where each fiber optic is an emission source 106 at an emission point 102. The fiber optics can be used to carry a signal from a signal source 140, either coherent or non-coherent, to each emission point 104 having a fiber optic emission source 106. Optical phase shifters 142 can also be included, and can be connected to the single source and each fiber optic emission source 106. The phase shifters 142 can be used to cause the signal from the signal source 140 to be phase shifted signal across the calibration array 102.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A method of correcting imaging data received from a sensor for environmental effects, the method comprising:
   placing a calibration system in an environment similar to or the same as a monitored environment from which imaging data is to be collected by a sensor during a data collection time period, the calibration system being configured to emit and/or radiate a test pattern having geometric, temporal, and/or electromagnetic characteristics, the calibration system having at least one emission/radiation point, each emission/radiation point including at least one emission/radiation source that emits and/or radiates in a region of the electromagnetic spectrum, the calibration system and the object being sufficiently far from the sensor so that imaging data collected by the sensor is distorted by atmospheric variables;

emitting and/or radiating the test pattern having geometric, temporal, and/or electromagnetic characteristics with the calibration system;

collecting imaging data from the calibration system with a sensor;

comparing the imaging data collected by the sensor from the test pattern to the geometric, temporal, and/or electromagnetic characteristics of the test pattern to determine distortion caused by the atmospheric variables;

determining an imaging error factor based on differences between the imaging data collected by the sensor from the test pattern and the geometric, temporal, and/or electromagnetic characteristics of the test pattern; and correcting the imaging data collected by the sensor from an object during the data collection time period by the error factor to reduce the distortion caused by the atmospheric variables.

2. The method of claim 1, wherein the test pattern is a trans-spectral test pattern and the sensor is a trans-spectral sensor.

3. The method of claim 1, wherein each emission/radiation point comprises a plurality of emission sources, and each emission source emit with a different electromagnetic signature.

4. The method of claim 1, wherein the calibration system comprises a calibration array, and each emission/radiation point is located at a known location on the calibration array.

5. The method of claim 4, wherein the calibration array comprises a non-emitting surface that is non-reflective.

6. The method of claim 4, wherein the calibration array comprises a panel of known trans-spectral reflectance.

7. The method of claim 6, wherein the panel of known trans-spectral reflectance is a white panel.

8. The method of claim 1, wherein the calibration system further includes a control unit operatively connected to the at least one emission/radiation point, and the method further comprises:

providing test pattern commands from the control unit to the at least one emission/radiation point in order to cause the at least one emission/radiation point to emit the test pattern, wherein the test pattern commands include the geometric, temporal, and/or electromagnetic characteristics of the test pattern.

9. The method of claim 8, further comprising:

receiving the test pattern commands from a remote location at a communications receiver of the calibration system; and providing the test pattern commands from the communications receiver to the control unit.

10. The method of claim 1, further comprising:

collecting test pattern data using test equipment of the calibration system during the emitting and/or radiating, the test pattern data including the state of each emission/radiation point of the calibration array; and transmitting the test pattern data from a transmitter of the calibration system to a remote location.

11. The method of claim 10, further comprising:

comparing the test pattern data to the geometric, temporal, and electromagnetic characteristics of the test pattern to determine a test pattern error factor based on any differences between the test pattern data and the geometric characteristics and electromagnetic characteristics of the test pattern; and adjusting the imaging error factor based on the test pattern error factor.

12. The method of claim 10 wherein the comparing includes comparing data related to the test pattern data to the imaging data collected by the sensor from the test pattern to determine the distortion and the determining includes determining the imaging error factor based on differences between the imaging data collected by the sensor from the test pattern and the data related to the test pattern data.

13. The method of claim 1, further comprising:

collecting environmental data using an environmental monitor of the calibration system regarding the environment in which the calibration system is placed; and communicating the environmental data from a transmitter of the calibration system to a remote location.

14. The method of claim 1, further comprising:

receiving global positioning signals at a GPS receiver of the calibration system; and transmitting positioning data from a transmitter of the calibration system to a remote location.

15. The method of claim 1 further comprising:

determining the orientation of the calibration sensor using an orientation sensor of the calibration system; and communicating the orientation from a transmitter of the calibration system to a remote location.

16. The method of claim 1, wherein the calibration system is programmed with the test pattern prior to the placing.

17. A calibration system that can be placed in an environment similar to or the same as a monitored environment from which imaging data is to be collected by a sensor and used for correcting imaging data received from the sensor, the calibration system and an object in the monitored environment being sufficiently far from the sensor so that imaging data collected by the sensor is distorted by atmospheric variables, the calibration system comprising:

a calibration array that emits and/or radiates a test pattern having geometric, temporal, and/or electromagnetic characteristics, the calibration array having a plurality of emission/radiation points, each emission/radiation point including at least one emission/radiation source that emits in a region of the electromagnetic spectrum;

a control unit operatively connected to the calibration array that provides test pattern commands to the calibration array in order to cause the calibration array to emit the test pattern; and a communication system operatively connected to the control unit that communicates data from the calibration system to a remote location.

18. The calibration system of claim 17, wherein the test pattern is a trans-spectral test pattern.

19. The calibration system of claim 18, wherein each emission/radiation point comprises a plurality of emission/radiation sources, and each emission/radiation source emits with a different electromagnetic signature.

20. The calibration system of claim 19, wherein the calibration array further comprises a non-emitting surface, and each emission/radiation point is located at a known location on the surface.

21. The calibration system of claim 20, wherein the surface is non-reflective.

22. The calibration system of claim 21, wherein the calibration array further comprises a panel of known trans-spectral reflectance.

23. The calibration system of claim 20, wherein the communication system includes a communications receiver that receives test pattern commands from a remote location and provides them to the control unit.

24. The calibration system of claim 21, further comprising built in test equipment operatively connected to the control unit that collects test pattern data when the calibration array that emits/radiates the trans-spectral test pattern, the test pattern data including the state of each emission point.

25. The calibration system of claim 24, wherein the data communicated from the calibration system to the remote location includes the test pattern data.

26. The calibration system of claim 17, further comprising an environmental monitor operatively connected to the control unit that collects environmental data regarding the environment in which the calibration system is placed.

27. The calibration system of claim 26, wherein the data communicated from the calibration system to the remote location includes the environmental data.

28. The calibration system of claim 18, further comprising a GPS receiver operatively connected to the control unit that collects global positioning signals.

29. The calibration system of claim 28, wherein the data communicated from the calibration system to the remote location includes positioning data.

30. The calibration system of claim 19 further comprising an orientation sensor connected to the control unit.

31. The calibration system of claim 20, wherein the test pattern is stored in the control unit.

32. The calibration system of claim 17, wherein the panel of known trans-spectral reflectance is a white panel.

* * * * *